United States Patent [19]
Gunther

[11] Patent Number: 6,120,083
[45] Date of Patent: *Sep. 19, 2000

[54] SHIELD DEVICE FOR A MOTORCYCLE WINDSCREEN

[76] Inventor: John Charles Gunther, 902 Charles Ave., Tomahawk, Wis. 54487

[ * ] Notice: This patent issued on a continued prosecution application filed under 37 CFR 1.53(d), and is subject to the twenty year patent term provisions of 35 U.S.C. 154(a)(2).

[21] Appl. No.: 08/714,764

[22] Filed: Sep. 16, 1996

[51] Int. Cl.⁷ ........................................ B60J 1/20
[52] U.S. Cl. ................ 296/78.1; 296/136; 296/97.7; 296/95.1; 150/167; 280/770
[58] Field of Search .................. 296/78.1, 95.1, 296/77.1, 80, 79, 82, 136, 97.7; 280/770; 114/361; 150/166–168

[56] References Cited

U.S. PATENT DOCUMENTS

| | | | |
|---|---|---|---|
| 597,298 | 1/1898 | Ross | 296/78.1 |
| 1,188,105 | 6/1916 | Schlegel | 296/78.1 |
| 1,239,916 | 9/1917 | Jose | 296/78.1 |
| 1,360,945 | 11/1920 | Harley | 296/78.1 |
| 1,532,008 | 3/1925 | Walford | 296/78.1 |
| 3,751,100 | 8/1973 | Keyes | 150/168 X |
| 4,655,497 | 4/1987 | Mallett | 296/78.1 |
| 4,943,103 | 7/1990 | Rosen | 296/97.7 X |
| 5,064,239 | 11/1991 | Folcik | 296/97.7 |
| 5,165,462 | 11/1992 | Kang | 296/97.7 X |
| 5,292,167 | 3/1994 | Hellman | 150/168 X |
| 5,356,193 | 10/1994 | Palmer, II et al. | 280/770 X |
| 5,458,390 | 10/1995 | Gilbert | 296/78.1 |
| 5,458,945 | 10/1995 | Tall | 280/770 X |
| 5,490,707 | 2/1996 | De La Cruz | 296/95.1 |
| 5,653,497 | 8/1997 | Campfield et al. | 296/97.7 X |
| 5,658,035 | 8/1997 | Armstrong | 296/78.1 |

FOREIGN PATENT DOCUMENTS

| | | | |
|---|---|---|---|
| 3447203 | 12/1984 | Germany | 296/97.7 |
| 3832770 | 5/1988 | Germany | 296/97.7 |

Primary Examiner—D. Glenn Dayoan
Assistant Examiner—Jason Morrow
Attorney, Agent, or Firm—Mark K. Johnson

[57] ABSTRACT

A shield device for a motorcycle windscreen which reduces reflected or refracted light from an unshielded windscreen to an operator, especially at night and aids in deflecting air and airborne road material without scratching or otherwise damaging the windscreen.

12 Claims, 1 Drawing Sheet

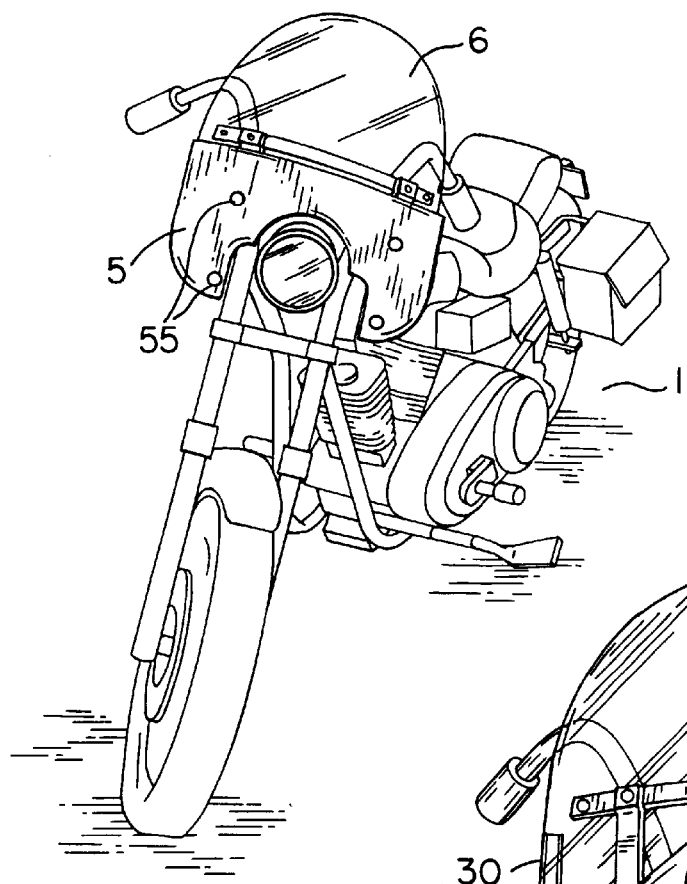
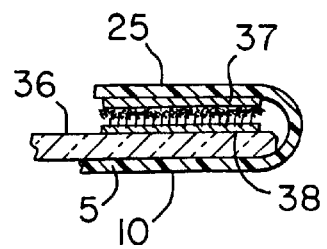
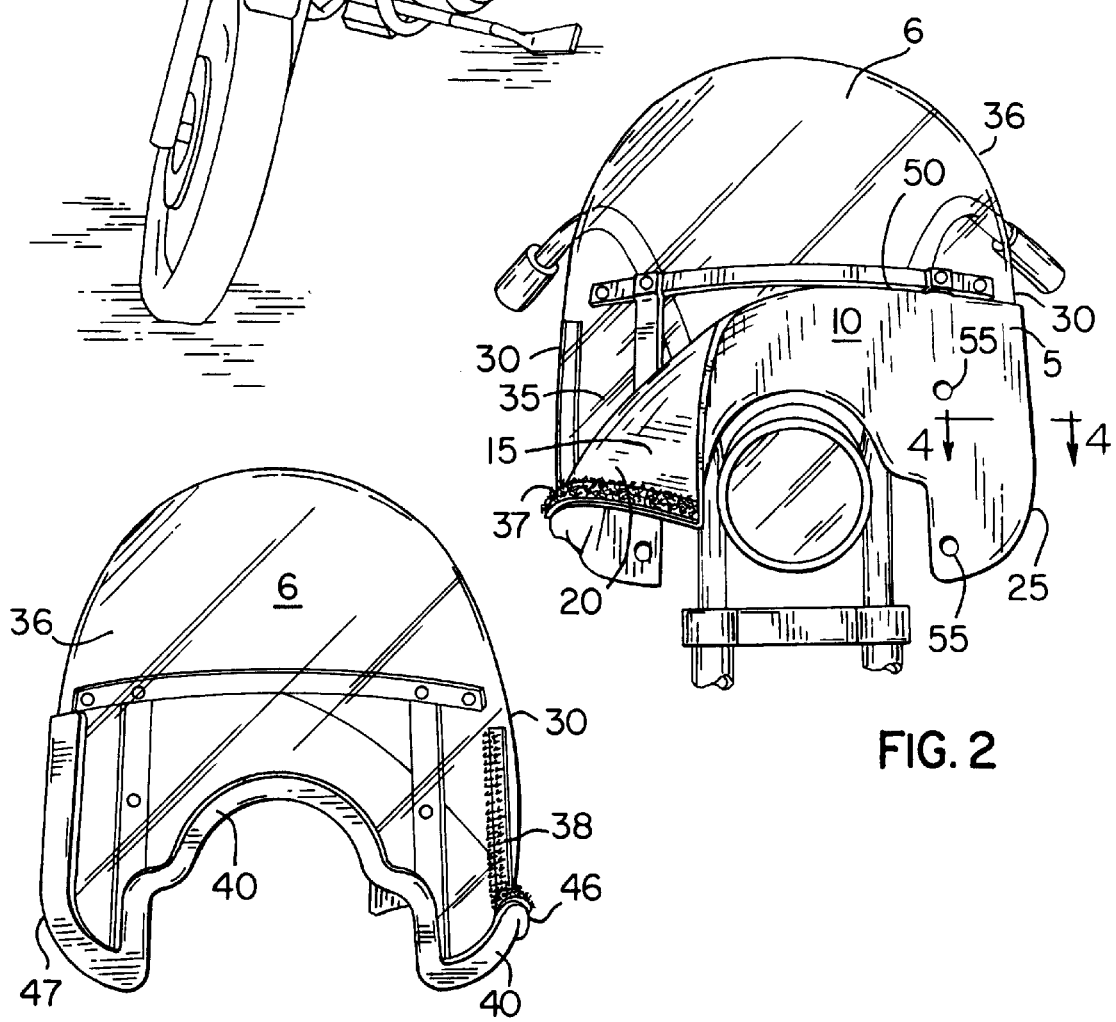
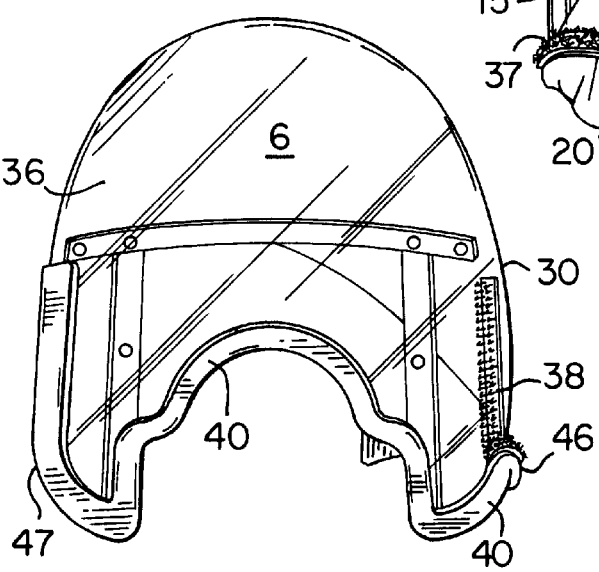

SHIELD DEVICE FOR A MOTORCYCLE WINDSCREEN

FIELD OF THE INVENTION

The field of the invention is a shield device for a motor vehicle. More specifically, a shield device is provided for use with a motorcycle windscreen to reduce reflected or refracted light to an operator.

BACKGROUND OF THE INVENTION

Covering units adapted for protective and/or decorative covering of selected parts of an automobile body have been utilized, and have included covers for portions of the front fenders, hood, bumper area, and/or headlamps housings. Such covers are often referred to as "shields", "masks" or "bras".

Shields have been designed for mounting on the forward portion of the automobile while the automobile is in operation. The shields are primarily used to protect the finish of the car from bugs and road debris which could otherwise chip paint and cause damage on the forward parts of the car. They are also used to enhance an automobile's appearance, i.e., to provide a more "racy" image to the car on which they are installed.

On motorcycles, shields have likewise been used on the fuel tanks of the motorcycle. The tank is generally located between the legs of a motorcycle operator. The motorcycle shields are also designed to protect the finish of the fuel tank and create a "racy" image. They have a large recess to allow access to the fuel tank and allow visibility to the speedometer, tachometer or other instrumentation which may be installed in the top of the fuel tank. Such shields are generally permanently installed and are not easily removed.

Vehicles and their exterior attachments are very vulnerable to damage by the elements and foreign objects when being driven, particularly at higher speeds. The expensive nature of repairing or replacing the exterior components to such vehicles forces a need for a protective cover, particularly one which would not detract from the appearance of the vehicle and would be stable at high speeds.

Some relevant prior patent art as known to the applicant at this time is set forth briefly below.

U.S. Pat. No. 1,360,945 was issued to William S. Harley of Harley-Davidson. It describes a windshield for shielding the body and head of the operator. The shield may be attached to motorcycle handle bars so as not to interfere with the steering action of the cycle.

U.S. Pat. No. 4,655,497 issued to Mallett describes a fairing attached to a bicycle. The fairing is a lightweight frame over which a fabric sheet is attached and also having a window.

U.S. Pat. No. 1,532,008 issued to Walford describes a windshield which is attachable to handle bars of cycles. U.S. Pat. Nos. 1,239,916, 1,188,105 and 597,298 describe shield devices for cycles.

A problem specifically related to motorcycles is glare, and especially night-time glare caused by other vehicle head lamps, street lighting or other sources of light when the light is deflected and/or refracted by the motorcycle windshield to the operator's eye. The glare, at least, is distracting to the operator and can interfere with vision for proper vehicle operation.

SUMMARY OF THE INVENTION

Applicant has invented a motorcycle windscreen shield which may be easily yet firmly attached and secured to the motorcycle windscreen to shield glare, and especially night-time glare, from the operator; and, to protect the windscreen surface from damage yet not blow away when the motorcycle is operating at highspeed. The general shape contours the shape of the motorcycle windscreen and may be made from vinyl or plastic or similar material with or without a liner.

The shield is designed for functionality, however, it also enhances the appearance of the motorcycle. Installed, it is quite stable when the motorcycle is moving at high speed and is readily removable when desired.

In combination with a motorcycle of a type having, forward of an operator, a windscreen which deflects air and airborne road material and reflects or refracts light; a shield device for protecting the windscreen and the operator, comprising a removable jacket, attachable to a portion of the motorcycle windscreen and a means of attaching the jacket to the windscreen.

It is an object of this invention to provide an improved apparatus for shielding glare and/or reflected or refracted light from impairing an operator's vision and for protecting selected portions of the exterior surface of a motorcycle windscreen from physical damage, which is easily installable and removable. The shield is designed to prevent glare, especially night-time glare, from light reflected or refracted by the windscreen. The shield also provides protection against small flying stones, chips, or other airborne debris that may cause damage to the windscreen. It further provides a surface softer than the windscreen to absorb some of the force of flying debris thereby protecting the operator from the full impact of objects deflected off the windscreen. Designs, patterns, colors, or other indicia may be printed or otherwise marked upon the flexible material.

Another object of the invention is securing the cover adjacent to the selected portion of the exterior surface of the vehicle body and maintaining the cover in conformity with the contoured area and edges; thereby providing an aerodynamic profile complementary to the external profile of the windscreen to which it is attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a perspective view generally illustrating the shield in relation to the overall motorcycle.

FIG. 2 is a front view of the shield partially attached to a windscreen with a corner loosened from a first windscreen attachment device and further illustrating a second windscreen attachment device.

FIG. 3 is a rear view of FIG. 2 illustrating the first windscreen attachment device and the shield flange around the windscreen edge.

FIG. 4 is a section along lines 4—4 of FIG. 2 illustrating the first windscreen attachment device.

DETAILED DESCRIPTION OF THE INVENTION

Referring now to the figures and particularly first to FIG. 1 motorcycle 1 is illustrated with a shield device for a motorcycle windscreen. The windscreen is common to many motorcycles and is usually made of a transparent material shaped and positioned to deflect air and road material away from an operator for a more aerodynamic and comfortable ride as well as for operator protection and safety; yet, the operator is able to clearly see ahead without much obstructed viewing. However, the windscreen also deflects, reflects and refracts light striking it in a manner that is at least annoying and at most dangerous to an operator. Jacket 5 is comprised of a Naugahyde sheet of material sized to protectively cover and snugly fit motorcycle windscreen 6 in a preferred embodiment. Jacket 5 may comprise any material suitable to protecting a motorcycle windscreen. Suitable material is defined as material having one or more of the following qualities: flexibility to contour to a motorcycle windscreen surface; the ability to maintain its shape in high wind forces; wind and weather resistant; resistant to flying debris such as rocks and other material found on roads that may become airborne; debris impact absorbing to reduce the speed of objects deflected from the windscreen toward the operator; allows marking by screen printing, hot stamping, thermography, hand lettering, etc. to provide distinctive indicia thereon (for example, a vehicle name, company name, sponsor's name or other logo may be displayed upon the jacket 5). Examples of suitable material includes: leather, Lycra, neoprene, nylon and other plastics or natural materials.

Jacket 5 may be any color. However a major property of the shield is to prevent night-time glare from lights reflected or refracted by the windscreen; therefore, a suitable material would have this property. For example, jacket 5 may be a matte black finish, or any other light absorbing color, to suit design preference and intended use.

In a preferred embodiment, jacket 5 is shaped to contour to the motorcycle windscreen 6, particularly a Harley-Davidson motorcycle. As illustrated in FIG. 2, jacket 5 comprises a front surface 10, which deflects light and the brunt of flying road debris, and a rear surface 15, which is positioned adjacent to the windscreen when mounted on windscreen 6.

Securing jacket 5 to the contours the curved shape of windscreen 6 is an attachment means comprising, in the preferred embodiment, a first flap 20 and a second flap 25 formed to align with and wrap around side edges 30 of windscreen 6. As illustrated in FIG. 2, 1st flap 20 and second flap 25 secure jacket 5 by snugly wrapping around side edges 30 such that jacket 5 is tensioned across front surface 35 of windscreen 6. Approximately 1 inch of flaps 20 and 25 fold around to rear surface 36 where they are attached. In the preferred embodiment, Velcro strips 37, as illustrated in FIG. 4, are attached to rear surface 15 of flaps 20 and 25 and complementary strips 38 are attached vertically to rear surface 36 of windscreen 6 near each side edge 30.

A pocket 40 is formed along the underside of jacket 5 for engagement with the lower edge of windscreen 6 and wraps around to overlap rear surface 36 by about 1 inch along entire lower edge from point 46 to point 47 (FIG. 3). Pocket 40 is designed to contour and snugly fit adjacent lower edge 45, however, the shape of motorcycle windscreens vary, therefore the shape of pocket 40 and jacket 5 may be modified to fit each application. When attaching the shield, pocket 40 is first slid over the lower edge of windscreen 6 and pulled up securely such that it contours lower edge, applying a uniform tension throughout the entire surface of jacket 5; tightly wrapping flaps 20 and 25 around side edges 30 and securing Velcro strips 35 to complement strips 37.

Top edge 50 is shaped in a straight line contouring windscreen 6 but low enough to avoid inhibiting an operator's vision. To be sized to fit, jacket 5 may be scissors cut, die cut, knife cut, strip cut, routed, laser cut, water jet cut, molded, sewn, formed etc. to suit manufacturing preference.

As a further shield connecting mechanism, eyelets 55 are formed in jacket 5 which allow the passage of screws 60 to fasten jacket 5 to windscreen 6. Eyelets 55 are sized smaller than the heads of appropriately sized screws to sandwich eyelets 55 between windscreen 6 and the heads.

It is noted that many fastening methods may be utilized with the present invention, including snaps and adhesives other than the Velcro and screw methods provided in the preferred embodiment. Furthermore, jacket 5 need not wrap around windscreen 6 but may be sized with edges identical to windscreen 6 edges and attached directly to the front surface of windscreen 6. Moreover, jacket 5 may be sized such that the front surface is equal in size to the rear surface and encompasses the entire lower half of the windscreen over the front surface as well as over the rear surface.

The foregoing is considered as illustrative only of the principles of the invention. Further, since numerous modifications and changes will readily occur to those skilled in the art, it is not desired to limit the invention to the exact construction and operation shown and described. Therefore, all suitable modifications and equivalents fall within the scope of the invention.

I claim:

1. In combination with a motorcycle having a transparent windscreen which deflects air and airborne road material and reflects or refracts light; a shield device for protecting the windscreen and an operator while the motorcycle is in motion, comprising: an opaque, flexible, removable jacket having a plurality of eyelets, attachable to a portion of the motorcycle windscreen and covering a part of the windscreen surface at least including an area defined by four eyelets when attached such that the operator maintains a view through a sizable portion of the transparent windscreen above the jacket; wherein substantially an entire surface of the jacket is in contact with the windscreen.

2. The shield device of claim 1 wherein the jacket is attachable to a lower portion of the motorcycle windscreen.

3. The shield device of claim 2 wherein the jacket comprises a flexible material allowing the jacket to fit snugly to contours of the windscreen.

4. The shield device of claim 3 wherein the attachment means comprises a connector located adjacent to an edge on a rear surface of the jacket.

5. The shield device of claim 4 wherein each eyelet is sized to allow a fastener to pass through.

6. The shield device of claim 4 wherein the jacket further comprises a material that accepts marking to provide distinctive indicia thereon.

7. The shield device of claim 1 wherein the jacket comprises a material that reduces glare, reflected and refracted light from the motorcycle operator's field of vision.

8. A shield device in combination with a transparent motorcycle windscreen which deflects air and airborne road material and reflects or refracts light for protecting the windscreen and a motorcycle operator while the motorcycle is in motion, comprising: an opaque, flexible, removable jacket having a plurality of eyelets, attachable to a lower portion of the motorcycle windscreen and covering a part of the windscreen surface at least including an area having an outer edge defined by four eyelets when attached such that the operator maintains a view through a sizable portion of the transparent windscreen above the jacket wherein the flexible jacket forms to a contour of the windscreen; and, wherein substantially an entire surface of the jacket is in contact with the windscreen.

9. The shield device of claim 8 wherein the jacket comprises a substance that lessens an amount of reflected or refracted light toward the operator.

10. The shield device of claim 9 wherein the jacket further comprises a material that enables marking to provide distinctive indicia thereon.

11. The shield device of claim 10 wherein each eyelet is sized to fit a fastener.

12. The shield device of claim 10 wherein the attachment means comprises a connector located adjacent to an edge on a rear surface of the jacket.

\* \* \* \* \*